(12) United States Patent
Meritt

(10) Patent No.: US 6,920,841 B2
(45) Date of Patent: Jul. 26, 2005

(54) UNITARY CONSTRUCTION ANIMAL FEEDER AND METHOD FOR MANUFACTURE

(76) Inventor: Rick Meritt, Route 8, Box 548, Gilmer, TX (US) 75644

( * ) Notice: Subject to any disclaimer, the term of this patent is extended or adjusted under 35 U.S.C. 154(b) by 0 days.

(21) Appl. No.: 09/920,231

(22) Filed: Aug. 1, 2001

(65) Prior Publication Data
US 2003/0024480 A1 Feb. 6, 2003

(51) Int. Cl.$^7$ .................................................. A01K 5/00
(52) U.S. Cl. ................................................... 119/51.01
(58) Field of Search ............................ 119/51.01, 52.1, 119/52.4, 53, 61, 63, 500, 501; D30/121, 133; 220/200, 227

(56) References Cited

U.S. PATENT DOCUMENTS

| | | | | |
|---|---|---|---|---|
| 485,142 A | * | 10/1892 | Stephens .................... 119/52.1 |
| 2,454,721 A | * | 11/1948 | Severance et al. .......... 119/52.1 |
| 2,619,252 A | * | 11/1952 | De Hoffmann ............. 220/227 |
| 2,638,871 A | * | 5/1953 | Ruedemann ................. 119/53 |
| 2,808,029 A | * | 10/1957 | Geerling .................... 119/52.4 |
| 2,886,002 A | * | 5/1959 | O'Malley et al. .......... 119/52.1 |
| 2,988,047 A | * | 6/1961 | Hurdle ....................... 119/52.4 |
| D194,594 S | * | 2/1963 | Juculano ...................... D25/64 |
| 3,730,142 A | * | 5/1973 | Kahrs et al. ............. 119/51.04 |
| 3,780,701 A | | 12/1973 | Wentworth, Sr. .......... 119/51 R |
| 4,328,880 A | * | 5/1982 | Lapeyre ....................... 182/93 |
| 4,538,548 A | * | 9/1985 | Page .......................... 119/52.1 |
| 4,580,528 A | * | 4/1986 | Kendall ........................ 119/53 |
| 4,601,414 A | * | 7/1986 | Lawson ....................... 222/564 |
| 4,719,875 A | * | 1/1988 | Van Gilst ................... 119/53.5 |
| 4,815,621 A | * | 3/1989 | Bartis .......................... 220/565 |
| 4,986,220 A | * | 1/1991 | Reneau et al. ........... 119/57.91 |
| 5,069,164 A | | 12/1991 | Wiwi ............................ 119/53 |
| 5,086,730 A | | 2/1992 | Figley ....................... 119/52.3 |
| 5,195,459 A | | 3/1993 | Ancketill .................... 119/57.9 |
| 5,275,131 A | * | 1/1994 | Brake et al. .................. 119/63 |
| 5,339,996 A | * | 8/1994 | Dubbert et al. .......... 222/185.1 |
| 5,435,267 A | * | 7/1995 | Patterson ................... 119/52.4 |
| D371,228 S | * | 6/1996 | Monin ....................... D30/121 |
| 5,570,547 A | * | 11/1996 | Webb et al. .................. 52/194 |
| 5,740,757 A | | 4/1998 | Smeester ................. 119/51.02 |
| D397,527 S | * | 8/1998 | Bruder et al. ............ 119/51.02 |
| 5,794,561 A | | 8/1998 | Schulz ....................... 119/52.1 |
| 5,906,174 A | * | 5/1999 | Muldoon .................... D30/121 |
| 6,073,587 A | * | 6/2000 | Hill et al. ................... 119/474 |
| 6,082,300 A | | 7/2000 | Futch ...................... 119/51.11 |

OTHER PUBLICATIONS

"Welding," Microsoft Encarta Online Encyclopedia 2002 http://encarta.msn.com (1997–2002) Microsoft Corporation.*

"Introduction to Welding," Materials Engineering Group. Copyright 1997 Materials Engineering (UK) Ltd http://www.meg.co.uk/meg/app01.htm.*

* cited by examiner

Primary Examiner—Son T. Nguyen
(74) Attorney, Agent, or Firm—Gardere Wynne Sewell LLP

(57) ABSTRACT

An animal feeder has a feed hopper that has a filling end and a feeding end. The proximate ends of three or more legs are permanently attached to the feed hopper. A skid assembly is permanently attached to the distal ends of the three or more legs.

15 Claims, 3 Drawing Sheets

UNITARY CONSTRUCTION ANIMAL FEEDER AND METHOD FOR MANUFACTURE

FIELD OF THE INVENTION

The present invention relates to wildlife feeders and, more particularly to, a robust wildlife feeder having one-piece welded construction.

BACKGROUND OF THE INVENTION

Animal feeders are commonly used to feed both wild game and domestic livestock. These feeders are usually filled with grain or pellets of commercially produced feed. Many feeders use an electromechanical system to dispense the grain or feed into an area about the feeder. The dispensing system may also include a timer to distribute the grain or feed at set intervals during the day. These dispensing systems, however, are often very complex.

Complex dispensing systems add inherent weaknesses to the system. For example, a power source is required to operate the electromechanical components of the dispensing system. Some feeders include batteries, which must be periodically charged or replaced. Batteries may also be harmful to the environment if they develop leaks.

Alternatively, solar energy may be used to power the electro-mechanical dispensing systems. Solar-powered systems, however, tend to lack the power necessary to effectively operate the dispensing systems. Solar-powered systems also will not operate in cloudy or dark times of the day, which is when some animals prefer to feed.

If solar energy is used to maintain a battery-powered system, the feeder has the disadvantages of a battery-powered system and the added complexity and expense of a solar powered system. Additionally, complex dispensing systems have many moving parts, which may fail after prolonged operation or exposure to the elements. Consequently, more complex dispensing systems may require frequent maintenance, which further burdens a user.

Another disadvantage of many commercially available feeders is the materials with which they are constructed. Most feeders are constructed of light gauge sheet steel parts that are screwed together with small machine screws. Although the parts are typically galvanized, constant exposure to wind, rain, sleet or snow can cause sheet metal parts to rust or break after only a few months in the outdoors.

It would, therefore, be desirable to have a feeder that does not have a complex dispensing system, which has multiple parts that may fail after prolonged exposure to the elements. Additionally, there is a need for a feeder that does not require frequent maintenance. There is also a need for a feeder that is not constructed of materials that are susceptible to the outdoor environment.

SUMMARY OF THE INVENTION

According to one embodiment of the present invention, an animal feeder has a feed hopper that has a filling end and a feeding end. The proximate ends of three or more legs are permanently attached to the feed hopper. A skid assembly is permanently attached to the distal ends of the three or more legs.

According to another embodiment of the present invention, a method for fabricating an animal feeder includes the steps of providing a feed hopper having a filling end and a feeding end. The proximate ends of three or more legs are then welded to the feed hopper. A skid assembly is then welded to the distal ends of the three or more legs.

According to another embodiment of the present invention, a one-piece wildlife feeder has a feed hopper that has a filling end and a feeding end. The proximate ends of four legs are permanently attached to the feed hopper. A skid assembly is permanently attached to the distal ends of the four legs.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Although making and using various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

Figure 1:
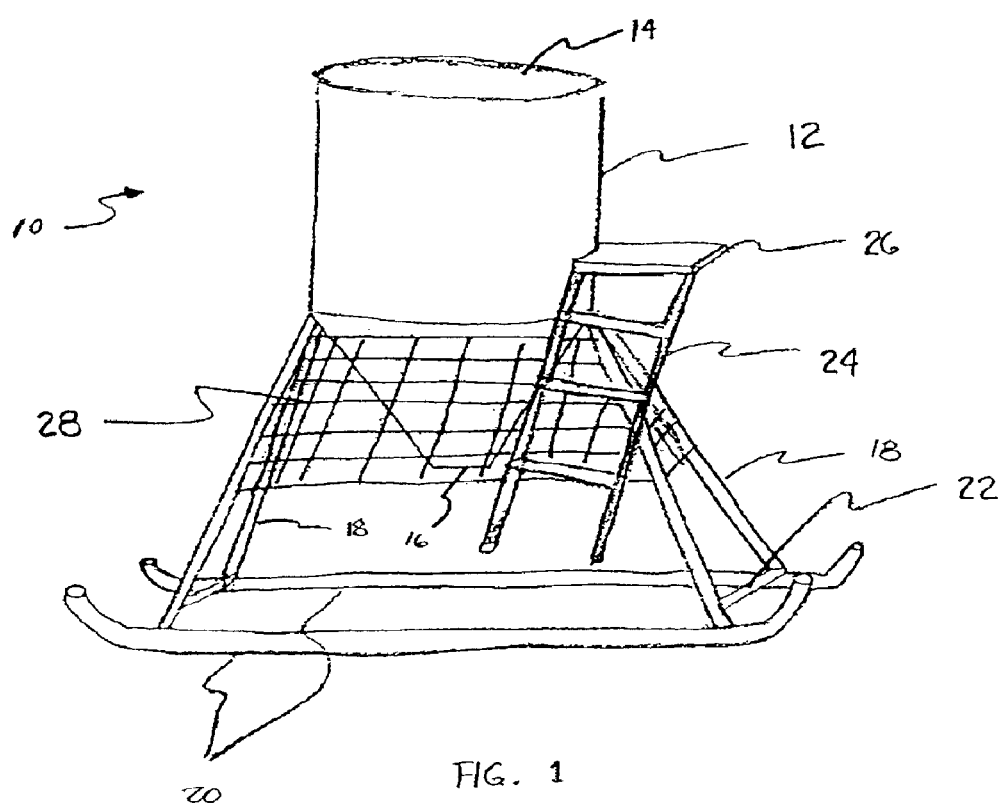
FIG. 1 is a perspective view of an animal feeder according to one embodiment of the present invention.

Referring to FIG. 1, a feeder 10 has a hopper 12. The hopper 12 has a filling end 14 and a feeding end 16. The hopper 12 may be elevated from the ground by three or more legs 18. A skid assembly 20 may be attached to the legs 18 to aid in moving the feeder 10 between different locations. A ladder 24 may be attached to the feeder 10 so that a user may more easily fill the feeder 10 with feed. A platform 26 may also be attached to the feeder to further assist the user with filling the feeder 10. A protective cage 28 may be attached to the feeder 10 to prevent rodents and other undesirable animals from accessing the feed or the interior of the hopper 12.

The hopper 12 may be fabricated from plate steel or other heavy gauge material, for example. The height and diameter of the hopper 12 may be varied according to the amount of feed a user desires to store and distribute. The hopper 12 may be preferably welded together to form a one-piece hopper 12. A single piece of plate steel, for example, may be roll formed into a generally cylindrical shape. The ends of the plate steel may then be welded to form the hopper 12. Unlike other methods of fabrication, such as riveting, for example, welding may eliminate weak joints in the hopper 12. Eliminating weak joints in the hopper 12 increases the durability of the hopper 12 and prevents elements such as rain or snow, for example, from entering the hopper 12.

The filling end 14 of the hopper 12 may have a cover (not shown) that shields the interior of the hopper 12 from environmental elements such as rain, snow or undesirable animals, for example. The cover may be hinged to the filling end 14 of the hopper 12. The cover may also be permanently attached to the filling end 14 of the hopper 12. If the cover is permanently attached to the filling end 14 of the hopper 12, the cover may have an access door, which will be described in more detail below, to allow the user to fill the hopper with feed.

The feeding end 16 of the hopper 12 may have a generally conical shape and be fabricated from the same plate steel as the hopper 12. The feeding end 16 may be similarly welded to the hopper 12 to eliminate weak joints in the feeder 10. The conical shape of the feeding end 16 allows the feed to be distributed by gravity rather than by mechanical or electromechanical systems. The feeding end may have a variety of different openings to most effectively distribute the feed from the hopper by gravity. However, mechanical or electromechanical systems may also be used to aid in distributing feed.

The three or more legs 18 may elevate the hopper 12 from the ground. Different lengths of legs 18 may be used according to an animal's height. For example, shorter legs 18 may be used if the user desires to feed small deer. Longer legs 18 may be used if the user desires to feed elk or other animals that are either tall or that have tall antlers. The number of legs 18 and spacing between the legs 18 may be selected according to the type of animal that is likely to feed from the feeder 10. For example, the legs 18 may be spaced further apart to accommodate animals that have wide spread antlers.

The legs 18 may be made from steel pipe, for example. The legs 18 may be welded to the hopper 12 to create a strong interface between the legs 18 and the hopper 12. Three or more legs 18 may be attached to the hopper 12 according to stability and space constraints. The legs 18 may contribute to the stability and rigidity of the feeder 18.

The skid assembly 20 may be fabricated of material similar to that of the legs 18. The skid assembly 20 may be welded to the legs 18 to add strength and stability to the feeder 10. The skid assembly 20 may also have a tow bar 22 welded to one or both ends of the skid assembly 20. The tow bar 22 may be used to move the feeder 10 from one location to another. The feeder 10 may be towed behind a tractor or a truck, for example.

The ladder 24 and the platform 26 may also be fabricated from steel and welded to the feeder 10. The ladder 24 and platform 26 allow a user to inspect and fill the hopper 12. Permanently attaching the ladder 24 and the platform 26 to the feeder 10 further simplifies the use and maintenance of the feeder 10.

The protective cage 28 may be fabricated from a steel grid or mesh and welded to the feeder 10. The protective cage 28 may enclose the feeding end of the hopper 16 and prevents undesired animals and rodents from accessing the interior of the hopper. Consequently, the protective cage 28 may extend the supply and quality of feed within the hopper 12. Feed may be dropped from the feeder 10 or scattered through the protective cage 28 by methods and systems known by those having ordinary skill in the animal feeder art.

Figure 2:
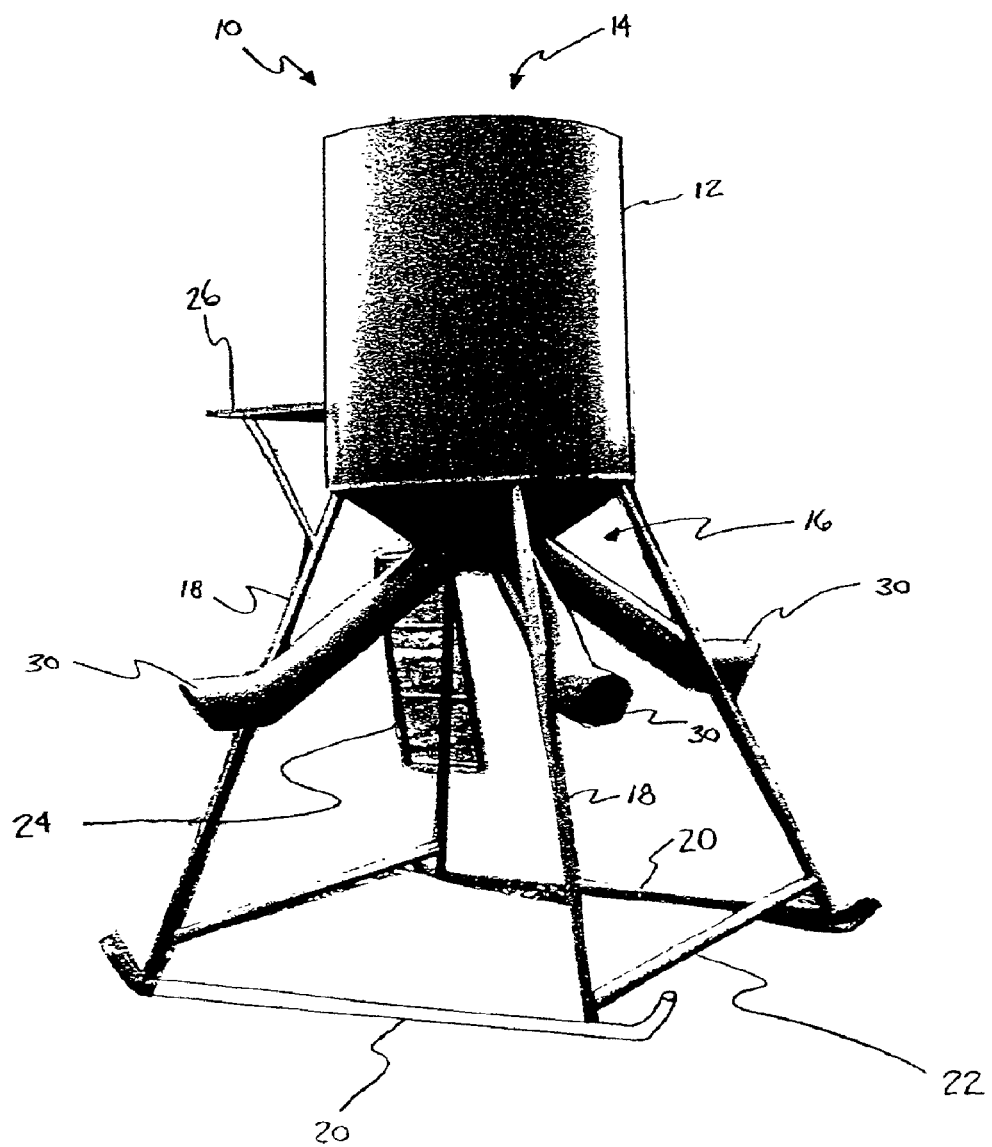
FIG. 2 is a perspective view of an animal feeder according to one embodiment of the present invention.

Referring now to FIG. 2, a feeder 10 having multiple feed tubes 30 is depicted. A protective cage 28 is not incorporated in this particular embodiment of the feeder 10. One or more feed tubes 30 may be attached to the feeding end 16 of the hopper 12. The feed tube 30 may be fabricated from steel pipe and welded to the feeding end 16 of the hopper 12. The diameter of the feed tube 30 may be selected according to the size of the animal to be fed. For example, the feed tube 30 may have a diameter to accommodate the snout or entire head of an animal.

Gravity may urge the feed from the hopper 12 down the body of the feed tube 30 and the feed may collect in the generally horizontal end. Other methods of conveying feed from the hopper 12 to the end of the feed tube 30 will be apparent to those having ordinary skill in the art. As an animal eats feed from the feed tube 30, additional feed from the hopper 12 cascades into the feed tube 30 and is presented to the animal.

Figure 3B:
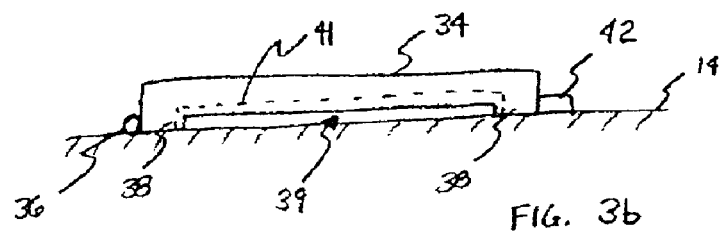
FIG. 3 is a perspective view of an upper portion of an animal feeder according to one embodiment of the present invention.
Figure 3A:
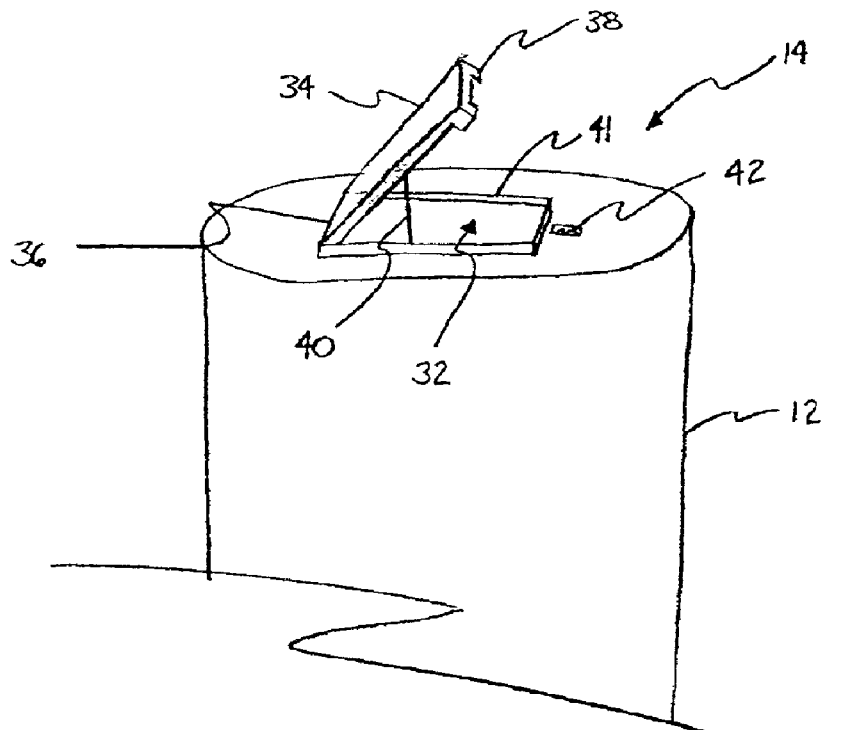
Figure 3C:
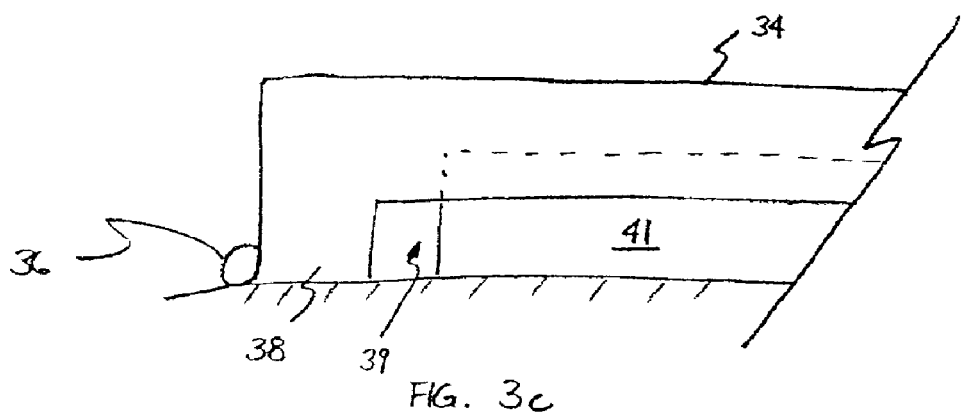

Referring now to FIGS. 3a, 3b and 3c, an upper portion of a feeder 10 having an access door 32 in the filling end 14 is depicted. A breathable lid 34 having a hinge 36 that allows the breathable lid 34 to be opened and closed may cover the access door 32. The breathable lid 34 may have legs 38 that elevate the breathable lid 34 from the filling end 14 in the closed position (depicted in FIGS. 3b and 3c). The breathable lid 34 may have a prop 40 that holds the lid breathable 34 open so that a user may fill the feeder 10 with feed. A latch 42 may be attached to the filling end 14 to secure the breathable lid 34. The latch 42 may prevent animals from accessing the interior of the hopper through the access door 32. The latch 42 may also prevent strong winds from blowing the breathable lid 34 open.

FIGS. 3b and 3c depict the breathable lid 34 in the closed position. The legs 38 rest against the filling end 14 and slightly elevate the breathable lid 34, thereby creating a gap 39. The gap 39 allows air to circulate within the hopper 12 but an inner lip 41 prevents rain and other elements from entering the hopper 12. The inner lip 41 may be plate steel welded around the perimeter of the access door 32.

Although this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An animal feeder consisting of:
    a feed hopper having a filling end and a feeding end, wherein the filling end has a cover having an access door opening;
    an upwardly extending lip placed around at least a portion of the perimeter of the access door opening;
    a lid having open and closed positions to open and close off the access door opening, respectively;
    an edge member joined to the edge of the lid to extend around at least a portion of the lip when the lid is in its closed position, the edge member having a gap formed therein so that the lip extends above the gap when the lid is in its closed position, wherein further the edge member is configured to support the lid above the lip in spaced apart relationship when the lid is in its closed position;
    a protective cage proximate to the feeding end of the hopper;
    at least three legs, the proximate ends of the legs permanently attached to the feed hopper; and
    a skid assembly permanently attached to the distal ends of the legs.

2. The animal feeder of claim 1, wherein the feed hopper is fabricated from plate steel.

3. The animal feeder of claim 1, wherein skid assembly is releasable attached to a vehicle.

4. The animal feeder of claim 1, wherein feed is distributed by gravity from the feeding end of the feed hopper.

5. The animal feeder of claim 1, wherein the protective cage encloses the feeding end.

6. The animal feeder of claim 1, wherein the feeder is welded together to provide a single, unitary structure.

7. An animal feeder consisting of comprising:
- a feed hopper having a filling end and a feeding end, wherein the filling end has a cover having an access door opening, an upwardly extending lip placed around a portion of die access door opening, and a lid for opening and closing off die access door opening, wherein the lid incorporates an edge member having a gap therein, wherein the edge member extends around at lease a portion of the lip when the lid is in the closed position, thereby permitting the lid to be breathable and to form a protective barrier for the access door opening and wherein the feeding end has at least one feeding tube;
- a platform attached to the feed hopper;
- a ladder attached to the platform;
- at least three legs, the proximate ends of the legs permanently attached to the feed hopper; and
- a skid assembly permanently attached to the distal ends of the legs.

8. The animal feeder of claim 7, wherein the feeder is welded together to provide a single, unitary structure.

9. The animal feeder of claim 7, wherein the feed hopper is fabricated from plate steel.

10. The animal feeder of claim 7, wherein the skid assembly is releasable attached to a vehicle.

11. The animal feeder of claim 7, wherein feed is distributed by gravity from the feeding end of the feed hopper.

12. An animal feeder consisting of:
- a feed hopper having a filling end and a feeding end, wherein the filling end has a cover having an access door;
- an upwardly extending lip placed around at least a portion of the perimeter of the access door opening;
- a lid having open and closed positions to open and close off the access door opening, respectively;
- an edge member joined to the edge of the lid to extend around at least a portion of the lip when the lid is in its closed position, the edge member having a gap formed therein so that the lip extends above the gap when the lid is in its closed position, wherein the edge member is configured to support the lid above the lip in spaced apart relationship when the lid is in its closed position;
- at least three legs, the proximate ends of the legs permanently attached to the feed hopper; and
- a skid assembly permanently attached to the distal ends of the legs.

13. The animal feeder of claim 12, wherein the feed hopper is fabricated from plate steel, and wherein the edge member is configured to support the lid above the lip in spaced apart relationship when the lid is in its closed position.

14. The animal feeder of claim 12, wherein skid assembly is releasable attached to a vehicle.

15. The animal feeder of claim 12, wherein feed is distributed by gravity from the feeding end of the food hopper.

* * * * *